United States Patent
Sandor

[15] 3,705,695
[45] Dec. 12, 1972

[54] DISINTEGRATING AND MIXING APPARATUS ESPECIALLY FOR ANIMAL FOODS

[72] Inventor: Bela Thomas Sandor, Ayr, Scotland
[73] Assignee: Automated Feed Mills Limited, London, England
[22] Filed: Oct. 6, 1970
[21] Appl. No.: 78,379

Related U.S. Application Data

[63] Continuation-in-part of Ser. No. 871,617, Nov. 10, 1969, abandoned, which is a continuation of Ser. No. 665,843, Sept. 6, 1967, abandoned.

[30] Foreign Application Priority Data

Sept. 6, 1966 Great Britain............39663/66

[52] U.S. Cl...................................................241/34
[51] Int. Cl..............................................B02c 23/02
[58] Field of Search............................241/30, 33, 34

[56] References Cited

UNITED STATES PATENTS

| | | | |
|---|---|---|---|
| 3,200,867 | 8/1965 | Stephan | 241/34 X |
| 2,235,928 | 3/1941 | Hardings | 241/34 |
| 2,427,903 | 9/1947 | Crites | 241/33 |
| 2,965,316 | 12/1960 | Henderson et al. | 241/34 |
| 2,974,885 | 3/1961 | Molling | 241/30 |
| 3,421,703 | 1/1969 | Galer | 241/34 X |

*Primary Examiner*—Granville Y. Custer, Jr.
*Attorney*—Watson, Cole, Grindle & Watson

[57] ABSTRACT

An apparatus for grinding and mixing animal or other food stuff ingredients, including one or more storage silos, metering augers associated therewith for feeding a measured batch of grain to a feed bin and therethrough to grinders such as hammer mills from which the ground ingredients are fed directly into a mixer. A metered batch of additives which do not require grinding is also fed directly into the mixer.

The entire plant is automatically controlled so as to empty the mixer automatically at the end of a proper mixing period and, when the mixer is empty, to initiate or permit the measuring of the next batch, so that one batch follows another automatically until a desired quantity has been mixed.

Two mixers may be fed alternately from a single grinder or group of grinders so that while one mixer takes in the ingredients, the other mixer completes the mixing and the discharge of the previous batch. After each cycle the role of the mixers changes automatically.

In each case the supply from the silos to the feed bin of the grinder is prevented until both the feed bin and the mixer, to which the meal will be directed, are empty.

12 Claims, 11 Drawing Figures

INVENTOR,
BELA THOMAS SANDOR

BY Watson, Cole, Grindle & Watson
ATTORNEYS

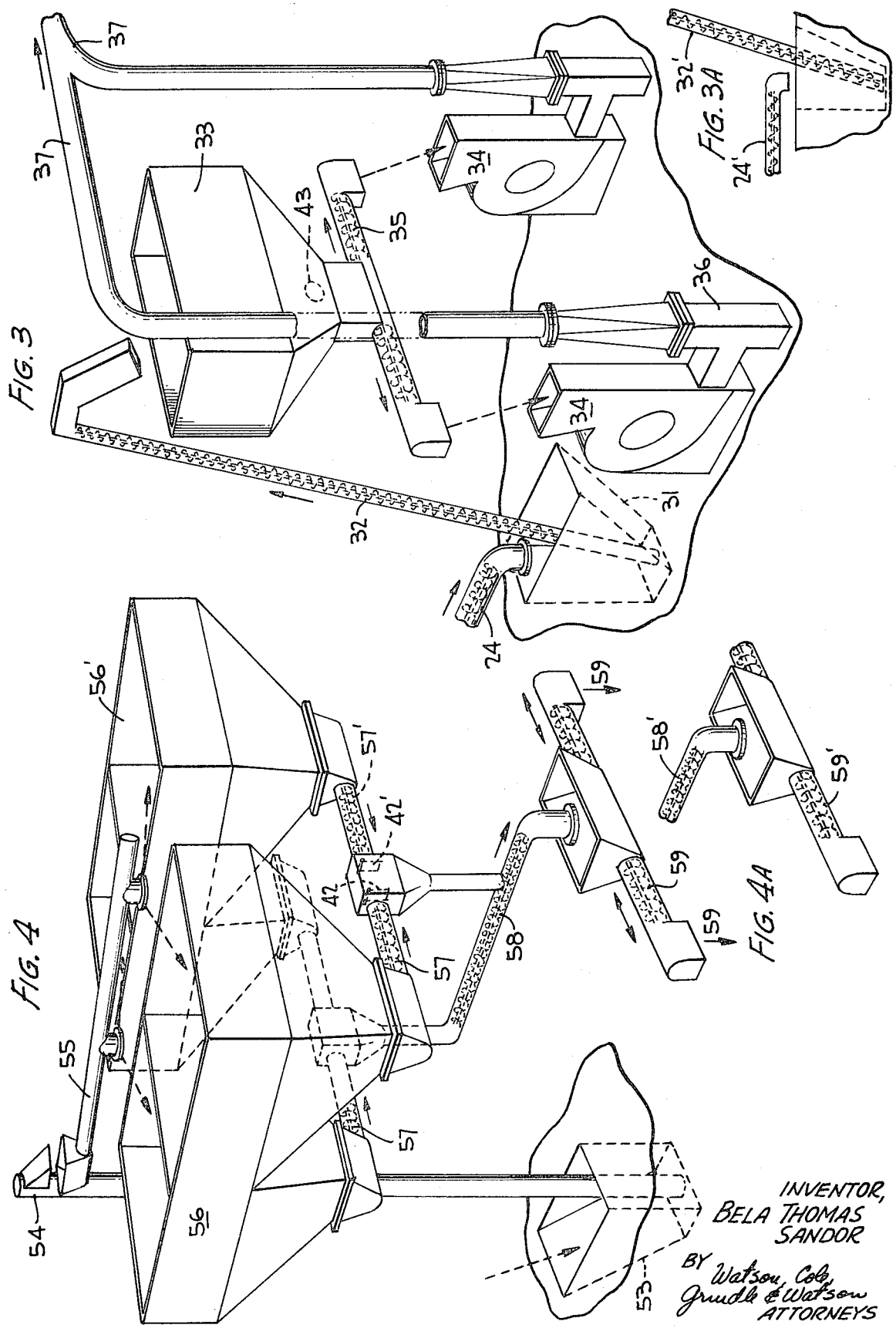

INVENTOR,
BELA THOMAS SANDOR

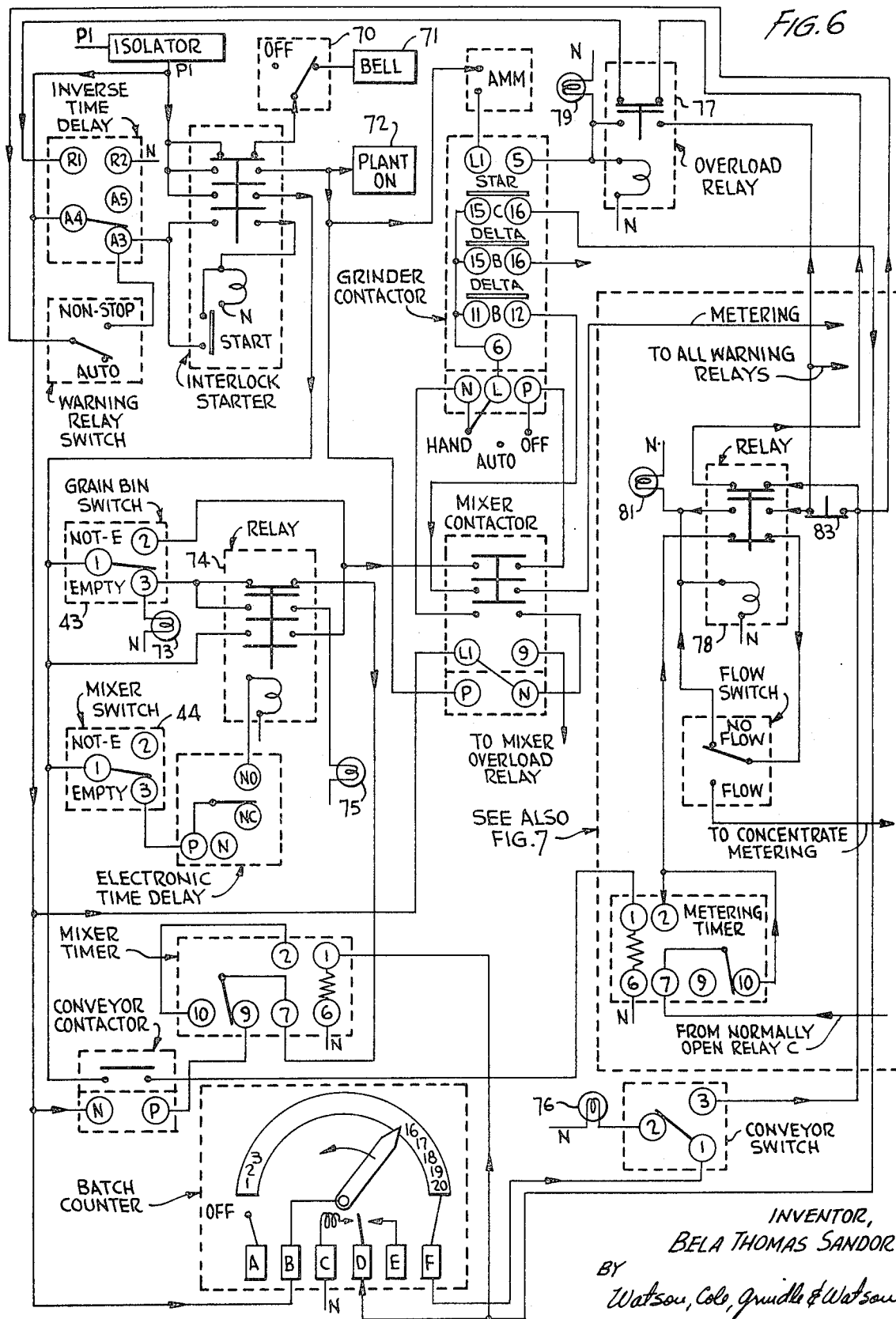

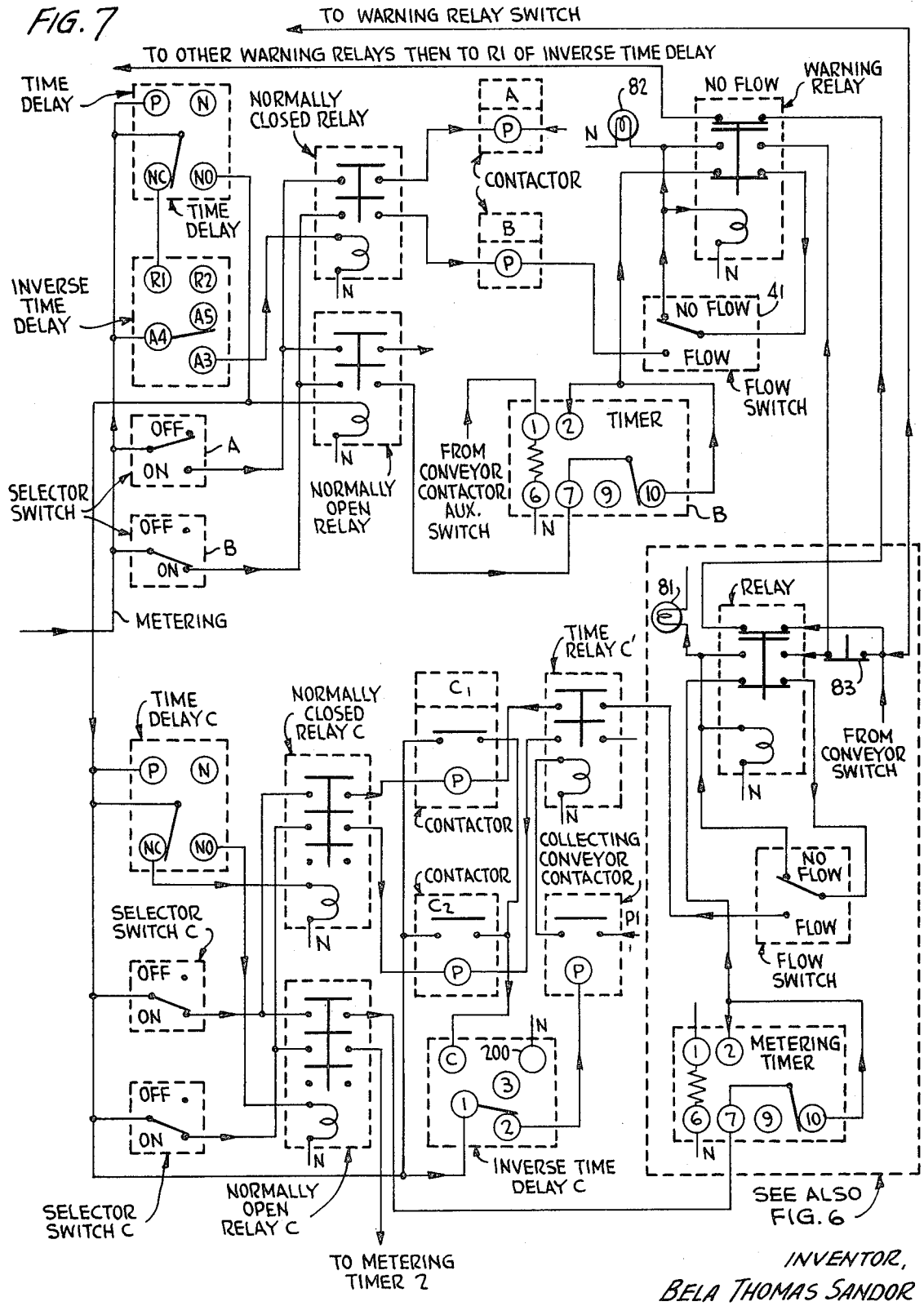

DISINTEGRATING AND MIXING APPARATUS ESPECIALLY FOR ANIMAL FOODS

This application is a continuation-in-part of my copending application, Ser. No. 871,617, filed Nov. 10, 1969, now abandoned, which was a continuation of my then copending application, Ser. No. 665,843, filed Sept. 6, 1967 and now abandoned.

This invention relates to disintegrating and mixing apparatus and is particularly, although not exclusively, concerned with the preparation of animal feeding stuff.

According to modern practice animal foods are normally produced by grinding or otherwise disintegrating various grains and mixing them with protein concentrates, minerals or other additives which usually do not require grinding. The various grain are stored in silos and, after grinding, the ground meals are usually stored in individual bulk bins, to be withdrawn in the required proportions for subsequent mixing. The additives which do not require grinding are usually fed into the mixer, and the resulting mixture is then used either in the form of meal, or is converted into cubes or pellets.

According to the present invention, disintegrating and mixing apparatus for preparing successive batches of material, especially animal feeding stuff, includes means for grinding or otherwise disintegrating a measured quantity of at least one ingredient for each batch and a mixer for mixing it with a measured quantity of at least one other ingredient, in which the ingredients to be disintegrated are automatically measured as they are fed to the disintegrator through a bin feeding it, and are conveyed as soon as disintegrated direct from the disintegrator to the mixer, and in which the supply to the disintegrator of the measured quantity of ingredient for each batch is automatically initiated when or shortly after the mixer into which the disintegrated ingredients should be conveyed becomes empty.

Preferably the initiation of the supply to the disintegrator of the measured quantity of ingredients for each batch is prevented until the bin feeding the disintegrator is empty.

The mixer is provided with level-responsive means arranged to initiate or permit resumption of the supply when the level in the mixer falls below a given level. Alternately, the resumption of supply may be under the control of timing means adjusted to allow somewhat more than sufficient time for the mixer to become empty.

Conveniently at least one ingredient is metered by a continuous metering device such as, for example, an auger or screw conveyor designed for metering by volume. It has been found that the same auger running at the same speed will always meter out from the same bin materials having the same density and the same flow characteristics at the same flow rate. Thus by simply weighing a given quantity of material metered out in one or two minutes, an auger can be calibrated so as to deliver a given weight for a given number of revolutions and, if its speed is constant, it can be controlled by a time switch to deliver a given weight of material before the time switch switches it off.

Instead of being driven at a constant speed for a variable time, the auger may be driven for a constant time, its speed being varied in accordance with the measured quantity required. Alternatively, the speed may be allowed to vary and the quantity may be determined by the number of revolutions of the auger so as to compensate automatically for any changes of speed.

Means may be provided for automatically controlling the rate of feed to the disintegrator from the bin feeding it in accordance with the load on the disintegrator (or its driving means) so as to reduce the rate of feed if the disintegrator or its driving means tends to be overloaded. In any event the rate of feed to the disintegrator from its feeding bin will generally be very much slower than the rate of measured feed into that bin, for example, the time taken to feed a batch of grain into the bin may be a matter of minutes whereas the time required for disintegrating it may be a matter of hours.

In one form of the invention, in which a disintegrator delivers an ingredient to a single mixer, the disintegrator is automatically switched off when a measured quantity of the ingredient has been fed into the mixer, and remains switched off while the material is mixed in the mixer and discharged from it and is automatically switched on again when the mixer becomes empty. The disintegrator is provided with a bin through which the metered ingredient is fed to it and means for automatically stopping the disintegrator when the said bin is empty. Means are preferably provided for automatically preventing the metering device from running until the disintegrator is running at its working speed.

In an alternative form of the invention in which a disintegrator feeds two mixers alternately each mixer receives the disintegrated ingredient from the disintegrator while the other mixer is mixing and/or discharging a previous charge. In this way the period during which the disintegrator in inoperative can be reduced or eliminated. Thus depending on factors such as the output of the disintegrator, the capacity of the mixer, and the required mixing time the disintegrator may be kept running continuously, and the ingredient may be fed to it with relatively short breaks.

The apparatus may include means for feeding measured quantities of two or more different ingredients to the disintegrator. Thus each of a number of silos are provided with a metering auger, each of which is provided with a separate timing device so as to deliver the required quantity of each ingredient.

In this case the augers may operate simultaneously or successively. Alternatively the apparatus may include a premixer and means for feeding the measured quantities of different ingredients to it and feeding the mixture from it to the disintegrator.

The apparatus may also include one or more collecting conveyors for conveying one or more measured ingredients between the metering device and the disintegrator, and means for ensuring that the collecting conveyor runs whenever the metering device is running.

Various devices are to be hereinafter described provided for stopping the plant or interrupting its operation if it is not functioning as required.

Also, a batch counter is provided to switch off the apparatus when the required amount of material has been disintegrated and mixed. In addition, means are provided for automatically stopping the operation if a holding bin from which an ingredient is to be supplied becomes empty. Alternatively, in order to ensure that the operation is not interrupted because a bin is empty from which an ingredient would not be required, it may be preferable to rely upon a flow switch associated with a metering device and means for interrupting the operation if the flow switch indicates that an ingredient is not being metered when it should. This may be due to the fact that the metering device is not running when it should, or that the supply of ingredient is exhausted or interrupted by blockage. In this case means should be provided for rendering the flow switch ineffective for a limited period when starting, to enable the flow to become established.

The mixer is provided with a discharge conveyor which has means for automatically stopping it when the mixer is empty. In addition, where the discharge conveyor has a receptacle to receive the mixture from it, means are provided for automatically interrupting the operation when the said receptacle is full. Where the discharge conveyor is arranged to deliver the mixture either to a receptacle or to apparatus for performing a further process, the means for interrupting the operation may be arranged to cause delivery to be automatically resumed in response to a demand for mixture for the process.

The apparatus also includes indicating or warning devices provided with holding circuits to give and maintain an indication as to the source of a signal which interrupts the normal operation of the plant.

The instant invention is designed to make efficient use of the capacity and output of the various components of the equipment. Thus, a cycle of operations requiring little or no intermediate storage capacity may be continuously and automatically repeated so as to produce a substantial total output, for example, by running throughout the night. The equipment, although within the reach of farmers and other users whose resources would not permit the use of certain large scale known equipments, will nonetheless be capable of a very substantial output without requiring supervision or labor.

Other objects, advantages and novel features of the invention will become apparent from the following detailed description of the invention when considered in conjunction with the accompanying drawings, wherein:

FIGS. 2 to 5 are perspective showings of the equipment diagrammed in each of the blocks of FIG. 1, FIG. 2 showing the grain silos and metering equipment, FIG. 3 the feed bin and grinding equipment, FIG. 4 the additive bulk bins and metering equipment, and FIG. 5 the mixing equipment;

FIG. 3A is a perspective showing of part of a collecting auger and lifting auger for delivering metering quantities of grain to the feed bin;

FIG. 4A is a perspective showing of part of a collecting conveyor for delivering another group of additives from another set of bins to the reversible auger;

FIG. 6 is a wire diagram showing the details in effecting automatic operation of the equipment shown by FIGS. 2 to 5;

FIG. 7 is a wire diagram showing the manner of metering the various ingredients used during operation of the equipment shown by FIGS. 2 to 5.

Figure 2:
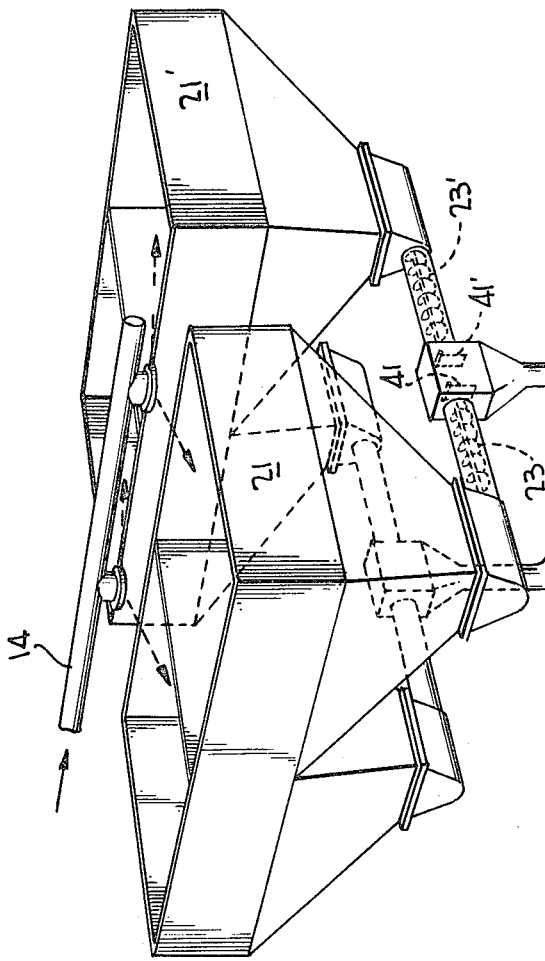

The grain silo and metering equipment shown in FIG. 2 comprises a number of grain silos or holding bins 21 and 21' of which there may be a number of rows, each bin having a capacity of about 75 tons with the bins 21 and 21', respectively, containing barley and wheat, for example. The various grains are delivered to the tops of the silos by means of longitudinal top conveyors 14 and if necessary transverse top conveyors (not shown), and from the bottom of each silo they are fed by means of grain metering augers 23 and 23' to a grain collecting auger 24 which is common to all the silos. Each auger consists of a screw conveyor and the metering augers are driven at a controlled speed, to be hereinafter described, so as to deliver a given quantity of each grain in a given time. The flow rate of the grains, e.g., 130 lb./min. and 155 lb./min. may be determined by single weighing tests in a little time as one or two minutes and it is found that in this way it is possible to deliver a given weight of grain in a given time within 1-1½ percent (plus or minus) accuracy.

Figure 2A:
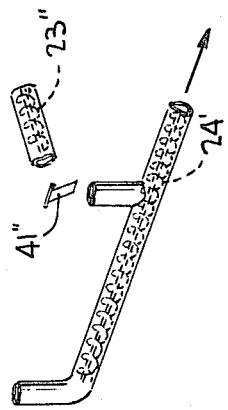
FIG. 2A is a perspective showing of part of a metering auger and collecting auger for delivering metered quantities of grain from another set of silos.
Figure 1:
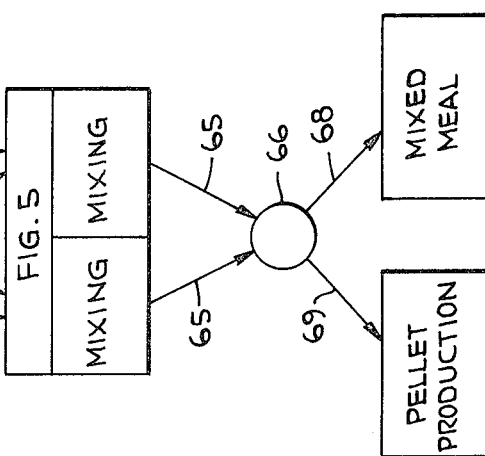
FIG. 1 is a block diagram of the technique used in grinding and mixing animal feeding stuff in accordance with the present invention.

As shown in FIG. 3, the grain collecting auger 24 delivers the grain or a mixture of grains, to a grain collecting pit 31 from which it is raised by a lifting auger 32 and delivered into a grain bin or feed bin 33 from which it passes to a number of hammer mills or grinders 34 by which it is ground to meal. A single feed bin is shown the capacity of which corresponds to the mixer capacity, but if desired there may be a number of such bins. Metering auger 23'', collecting auger 24' and lifting auger 32' may also be provided, as seen in FIGS. 2A and 3A, for delivering metered quantities of grain from another set of silos to the feed bin 33.

Figure 5:
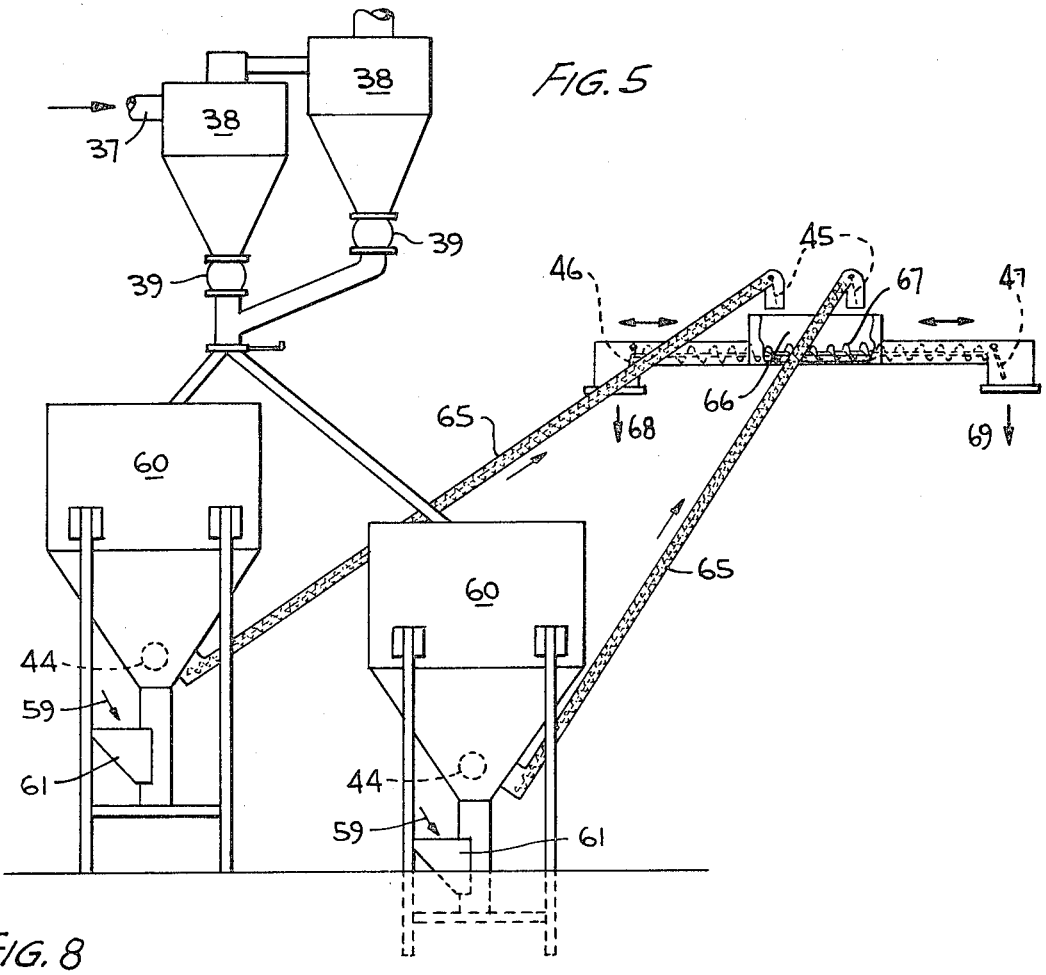

In the arrangement shown, the feed bin is provided with a feed regulating auger 35 which feeds the grain to the two hammer mills or grinders 34 in parallel. From each hammer mill the meal is blown by a fan 36 up a duct 37 (one of which is shown partly broken away for purposes of clarity) leading (as shown in FIG. 5) to a two-stage cyclone 38 whereupon it descends past motorized valves 39 to a pair of mixers 60 each of which may have a capacity of one and one-half tons. Alternatively, the ground grain may pass to the mixers by a conveyor or by gravity. In the mixers the ground grain is mixed with additives.

The additives or concentrates, prepared in various ways, may be stored in additive bulk bins 56 and 56', shown in FIG. 4. Like the grain silos each respective additive bulk bin has at the bottom a metering auger 57 and 57' delivering into a common collecting auger or conveyor 58 feeding a reversible auger 59. This can be driven in either direction so as to feed the additives to one or the other of the two hoppers 61 at the bottom of the two main mixers 60, shown in FIG. 5. Thus with the valve 39 in one position and the reversible auger 59 rotating in one direction, the meal and the additives will be fed into one of the two mixers 60, while with the valve in the other position and the auger rotating in the opposite direction, both will be fed into the other mixer. Also, another group of additives or concentrates may be delivered by a collecting conveyor 58' from another set of bins (not shown), to the same reversible auger 59 for feeding the additives into hoppers 61 in a similar manner as described with respect to the first-mentioned group of additives.

In some cases additives may be manually fed into the hoppers 61, for example from sacks.

It will be appreciated that the motorized valve 39 may be replaced by a reversible auger, and/or the reversible auger 59 may be replaced by a motorized valve, for determining to which mixer the meal and additives respectively are delivered.

From each main mixer 60 the mixed materials are raised by a meal discharge auger 65. Whenever a discharge auger runs the mixer also runs to assist discharge to a hopper 66 provided with a reversible auger 67. This can be driven in one direction to deliver the material, as indicated by the arrow 68, to the mixed meal production equipment and in the opposite direction, indicated by the arrow 69, to deliver it to the pellet production equipment.

It will be appreciated that the arrangement described is given merely by way of example and that many modifications are possible. In particular the various lines of equipment may be duplicated, and additional optional lines may be incorporated. For example, between the two hammer mills 34 described there may be a third hammer mill which can be fed from either row of silos or directly or through a pre-breaker from a grain pit into which grain is dumped. This mill can deliver meal to either of the cyclones 38 or to an additional cyclone for producing un-mixed meals. Again each hammer mill may feed a separate cyclone and each cyclone may feed a separate pair of mixers, all the ensuing equipment being duplicated.

In general the individual components of the system may be of any preferred known construction, and the invention resides in the manner in which they are combined and automatically actuated which will now be described. The equipment is capable of being operated in a number of different ways and it may be convenient for the user to choose the method of operation depending upon circumstances. In particular it may be convenient to set it for entirely automatic operation during the night so as to prepare a comparatively large quantity of a relatively straightforward mixture (possibly consuming cheap power), but during the day to deliver additives to it by hand in accordance with more varied requirements.

Assuming first that completely automatic operation is required it will be noted that the metering augers 23 and 23' deliver grain at a metered rate so that if operated for a given number of revolutions or for a given time at a controlled speed, they deliver a predetermined weight of grain to the hammer mills and therefore a predetermined weight of meal to the mixer. Similarly the additive metering augers 57 deliver a metered quantity of additives.

In the drawings, it will be seen that the respective silos 21 and 21', additive bins 58 and 58'; feed bin 33, mixers 60 and hopper 66 are each provided with a flow switch or level-responsive means or safety cut-out switch 41, 41', 42, 42', 43, 44, 45, 46 and 47 located substantially as shown in the drawings. For example, switches 41 and 41' are located at the ends of metering augers 23 and 23', switches 42 and 42' are located at the ends of metering augers 57 and 57', switch 43 is located in feed bin 33, switches 44 are located near the throat of each mixer 60, switches 45 are located at the end of augers 65 and switches 46 and 47 at the ends of conveyor 67. Each of these flow or level responsive means may comprise a flap extending transversely to the flow of materials or, in the alternative, may be diaphragm switches in lieu of the type of flap switch shown. Likewise, level responsive means 41'' is provided at the ends of metering augers 23'' (only one showing). A counterweight is secured to the connected end of each flap and is operatively associated with a microswitch (as part of the automatic control to be hereinafter described) for signalling whether feed bin 33 or mixers 60 are empty or whether said hopper 66 or the meal bins supplied by 67 are full. The flap or flow switches 41, 41', 42, 42' are constantly depressed during the flow of grain through the throat section. Accordingly, it's counterweight is lifted and its microswitch is closed thereby. When grain or additive flow ceases or is otherwise interrupted, the counterweight falls opening its microswitch and consequently stops the plant. Similarly, level-responsive means 43 serves to stop the grinders 34 when the feed bin 33 is empty, and the level-responsive device 44 in mixer 60 will likewise operate to initiate the next cycle of metering when one of the mixers is empty.

The equipment is provided with a sequence controller (of which there are various known types) or a number of timers, by which the whole equipment can be controlled to execute any one of a number of different programs, in accordance with requirements. Signals are fed into the control equipment from the level-responsive devices in the feed bin and in the mixers, and from the flow responsive devices in the various augers and from the cut-out switches of the conveyors and the equipment is designed to ensure completely automatic operation.

In order to illustrate possibilities certain specific programs will be generally described.

First, a program will be described which is suitable for a plant generally similar to that described with reference to the drawings but having only a single main mixer 60.

PROGRAM 1

1. The plant is started by a push button.
2. The grinder 34 is started.
3. The grain metering augers 23 and 23' are started.
4. When metered quantities have been delivered the augers 23 and 23' stop one by one and subsequently, when the grinding of the batch is completed and the feed bin 33 empties, the grinder stops and the mixer starts.
5. The additive augers 57 and 57' start and after delivering the metered quantities of additives they stop.
6. After the pre-set mixing time the discharge auger starts to empty the mixer.
7. When the mixer is empty it stops and its discharge auger stops.

Steps 2 to 7 are then automatically repeated.

PROGRAM 2

This program is the same as Program 1 except that the mixer, once started in step No. 1, runs continuously. In these circumstances step No. 5 is brought forward and the additive augers start before the grinder stops. In other respects this program is the same as Program No. 1. Program No. 2 is suitable for instances in which the output of the grinder is large in relation to the capacity of the mixer, so that the time taken to fill the mixer is not great in relation to the mixing and emptying time. The time saved in mixing must be balanced against the power needed to keep the mixer running continuously.

It will be appreciated that a single multi-program control unit may enable either Program 1 or Program 2 to be obtained at will in addition to numerous variations such as modifying the proportions of ingredients and the time of mixing. In addition many variations are possible in the operation of the metering augers which can be arranged to run either simultaneously or successively so as to feed different proportions of different grains from different silos. If desired the feed bin 33 may be replaced or supplemented by a pre-mixer.

Where, as shown in the drawings, the plant incorporates two mixers (which will be referred to as A and B) to either of which the meal from the same mill or mills can be delivered, the following program may be suitable:

PROGRAM 3

1. After setting timers for the required feed formula and the batch counter for the required quantity of mixture, a push button is operated whereupon the grinder and both mixers start, and keep running all the time.
2. When the motor of the mill is up to speed the grain metering augers start feeding grain into the grinder through the feed bin. Simultaneously the additive metering augers also start to feed additives into the same mixer (A) into which mill feeds ground meal.
3. The metering augers stop one by one and grinding and mixing in mixer (A) proceeds until the first batch of grain is exhausted from the feed bin; thereupon the motorized valve 39 changes over (or a reversible auger changes direction) so that the second batch of ground meal will be directed into the mixer (B).
4. As soon as the feed bin and mixer (B) are empty the metering of the second batch of grain into the feed bin, and also the second batch of additives into mixer (B) (by means of the reversible auger 59) can immediately commence. Grinding into and mixing in mixer (B) then proceeds.
5. Meantime mixer (A) completes the pre-set mixing time after which the discharge auger starts and empties mixer (A). When mixer (A) is empty the auger stops and mixer (A) becomes available for taking in the third batch of ingredients in a subsequent operation.
6. When the second batch of grain is exhausted the motorized valve and reversible auger change back to mixer (A) and metering of the third batch of grain and additives commences. Meantime mixer (B) completes the mixing and discharge operations of batch 2 as described above. The alternate use of the two mixers aforesaid is repeated automatically until the total quantity as set on the batch counter has been completed, when the plant stops. The plant also stops if the meal bin or bins into which the discharge auger conveys mixed meals become prematurely full or become over full or if the supply of any of the programmed ingredients is interrupted.

The precise details of the above program may be varied widely in accordance with taste and requirements. In general the operation will be terminated by a batch counter which is pre-set to stop the plant when a given number of cycles have been performed. In addition emergency devices are provided for ensuring that the operation of the plant will be stopped or interrupted if the supply of any of the ingredients should be exhausted or in the event of malfunctioning.

The operation of the equipment is controlled by a sequence controller embodying a master timer which may, if desired, control the complete cycle of operations, together with a batch counter which switches off the complete plant at the end of a desired number of cycles of operation. Each metering auger may, however, conveniently be controlled by an individual timer so that the amount of each ingredient fed in may readily be adjusted independently of other ingredients. The timers are self-resetting so as to return to the initial position but only when an electrical impulse given during a subsequent operation causes them to do so. Consequently if the operation should be interrupted for any reason and subsequently resumed, the timer will cause the remainder of the desired quantity of ingredient to be delivered and will not start a new cycle.

The complete program may be controlled entirely on a time basis, by allowing for each operation a period exceeding the maximum that will be required. In many cases, however, economy of time can be effected and the adjustment of the program simplified, by employing level-responsive or flow-responsive devices to control the starting and stopping of various operations. Also, such devices may be employed to provide an overriding or emergency control to delay the start of an operation if a previous operation has not been satisfactorily completed for any reason.

For example, with reference to FIGS. 2–5, at the end of Operation 4 in Program No. 1 when the metered quantities of grain have been delivered and ground and the meal discharged to the mixer, the starting of the mixer is initiated by a level-responsive device 43 in the feed bin 33 indicating that this bin is empty. Alternatively, a timed pause may be allowed after the switching off of the last auger, the time being chosen so that it will always be long enough to allow the bin to empty.

In addition, each metering auger 23, 23' and 57, 57' is preferably provided with a flow-responsive device 41, 41' and 42, 42' arranged to stop the plant if the respective auger is not running when it should or if there is no flow through it, because the supply of material to it is exhausted or interrupted by blockage. Also, the level-responsive device 43 serves to prevent any operation requiring a supply from bin 33, if it is empty.

In addition, the ends of each auger 65 are provided provided with cut-out means 45 to indicate that hopper 66 is full. The ends of top conveyor 67 are provided with cutout switches 46 and 47 to indicate that the meal bin they serve is full. In particular, if the hopper, which receives the mixed meal from the mixers should become full, means 45 will serve to stop the discharge conveyor 65 and this will automatically prevent any further ingredients from being fed from the corresponding mixer. The same applies to 46 and 47 which are electrically linked with 45 serving to stop the supply from the mixer. When sufficient material is drawn from hopper 66 or from the receptacle into which the material from hopper 66 is conveyed operation will be resumed.

The control mechanism should also be arranged to meet the following requirements. The supply of material to the feed bin 33 of a grinder 34 should be prevented until a the grinder 34 is running at full speed (b) the feed bin 33 becomes empty and (c) the mixer 60 becomes empty. The discharge auger 65 of the mixer 60 should start at the end of the pre-set mix. If the grinder is provided with a pre-mixer, the latter should be prevented from feeding pre-mixed grain until the grinder has attained full speed. The discharge auger 65 of a mixer should start at the end of the pre-set mixing time and should stop immediately if either the mixer becomes empty or the hopper 66 into which it discharges should become full. Whenever the discharge auger 65 runs the mixer should preferably also run to assist discharge.

Conventional relays and contactors are employed for controlling the driving motors of the various components, and where the control is required to depend on two or more conditions, conventional relays may be used, with 'normally open' and/or 'normally closed' set of contacts.

A detailed description of the automated features of the invention will now be made with reference to FIG. 6 assuming that two types of grain and two concentrates or other additives, and one grinder 34 and one mixer 60 are being used. However, it should be noted that, depending on the number of grains and additives, the number of grinders and mixers, the various conveyors used, and the number and selection of hoppers, several slight variations must be made. The mixer is set in this case to run permanently and the control circuit is designed to operate between P1 (phase No. 1) and N (neutral). When the isolator (main switch) is switched on Bell 71 rings but when the start button of the Interlock Starter is pushed, the bell stops, the "Plant On" 72 lights up and the operation commences.

P1 leading to P of the Mixer Contactor, will start up the mixer, to run permanently. P1 will also lead to 1 of the Grain Bin Switch and 1 of the Mixer Switch. If the mixer 60 is empty, it will energize, through 1 – 3, after a time delay, the coil of Relay 74, via P and NO of the Electronic Time Delay.

It should be noted that the Electronic Time Delay is required so that current is only established after the mixer is definitely empty. The Electronic Time Delay is inserted before the Relay 74 so that, if the Mixer Switch of the level responsive means 44 is not accurately set or meal is thrown while discharging onto it, the Relay 74 will not pull. The lever of the Mixer Switch may oscillate between 2 and 3 therein but, whenever it goes back to 2, no current goes to P of the Electronic Time Delay and, therefore, its lever remains in NO. Only after the lever of the Mixer Switch is permanently at 3 (mixer empty), and after the pre-set time of the Electronic Time Delay has expired, will its lever go to NO and pull Relay 74. This is called the "electrical stabilization of mechanical inaccuracies in the Mixer Switch."

When Relay 74 pulls, warning light 75 shows that the mixer is empty P1 current passes then through 1-2 of the Grain Bin Switch or directly via the top auxiliary contacts of the Mixer Contactor to P of the Grinder Contactor which starts the grinder 34 and actuates the auxiliary switches thereof. This insures that if the mixer 60 is not running, the grinder 34 cannot start. The 'Hand-Auto-off' switch of the Grinder Contactor works so that L (and 6) get current automatically from P if the switch is set to 'AUTO' or from N if set for 'Hand' operation. When the grinder is started up (through L), in the initial 'Star' position, the auxiliary switch Star 15-16 gives current to the Batch Counter (always set for the required batches plus one) and to 1 of the Mixer Timer, thereby re-setting the clutch of the Mixer Timer which controls the mixing time after the grinder has stopped.

After approximately 15-20 seconds of Star time, the Grinder Contactor switches to Delta whereupon Auxiliary Switch Delta 11-12 gives current for metering (to be later described in detail) via the second set of auxiliary switches of the Mixer Contactor. This insures that metering can only commence if the Mixer is running. The other connections of the Starter Contactor are available for hand starting, with interlocking, as required.

As metering proceeds, light 73 and thereafter light 75 of the respective level responsive means 43 and 44 are "off" showing a "not-empty" condition. After the mixer becomes not-empty, relay 74 drops out and, when feed bin 33 becomes empty again, the current for metering stops and 7 of the Mixer Timer receives current. Accordingly, 10 and 2 (clock) of the Mixer Timer are energized and, after a pre-set mixing time, e.g., 2 minutes, current will pass via 7 to 9 (as shown) to start the conveying auger 65 for emptying the mixer. As the auxiliary switch of the Conveyor Contactor pulls, current is given both re-setting the clutches of the metering timers for both concentrate and grain.

The self-resetting timers of the present invention work with inverse action clutches, contrary to the customary timers wherein the clutch is re-set for the next operation only when the current is cut off. Here, the timers are re-set with a positive current, which must cease before the next timing commences. A current applied to 1 of the Mixer Timer or any of the metering timers re-sets the respective clutch for the repeated operation. For this reason, the plant of the present invention is equipped with a "memory", i.e., if 100 kilogram of fish meal has been programmed in the formula and the plant stops for any reason after only 70 kilograms have been fed into the mixer, the clutch will not re-set and, after restarting, another 30 kilograms will be fed into the mixer.

When the mixer becomes empty, auger 65 stops and the operative cycle is repeated starting with P of the Grinder Contactor getting current for restarting the grinder. The entire operation as set out above thereafter repeats itself until one of the following causes occur: If the Batch Counter has gone through the number of operations for which it was set (plus one), no current passes via B to F therein. If the hopper 66 becomes full, while the mixer is being emptied, the Conveyor Switch switches to the conveyor warning light 76 thereby indicating a "BIN FULL" condition and no current passes to proceed with conveying. Accordingly, operation stops and the Plant locks out. When the mixer becomes empty the hopper 66 becomes full but when the mixer becomes empty the automated operation proceeds. The operation is also interrupted if the coil of any of the warning relays (e.g., 77 showing that the grinder is overloaded, or 78 showing that there is NO-FLOW from bins 56 or 21) gets current. The current to $R^1$ of the Inverse Time Delay is broken so that A4 switches after a short time to A5. With no current passing through A3 to the coil of the Interlock Starter, the Interlock Starter drops out, bell 71 sounds and lights 79 or 81 indicate that the failure remains on.

A count-down relay is used herein for the batch counter wherein twenty positions are connected by means of a brass strip. The counter always jumps when an electrical impulse is received, but current is supplied by it continuously, from the point at which it was set, e.g., 15, up to 0, when current is cut off and the plant stops. As shown by FIG. 6, the impulse is given by an auxiliary contact in the "Star" position of the Grinder Contactor and, therefore, the batch counter has always to be set for "plus one" for each start or re-start (16 if 15 batches are required). If a reversible top conveyor such as 67 is used to feed two or more meal bins, (under 68 and 69) safety cut-out switches 46, 47 must be provided at both ends of 67 which switches are electrically interlocked with the conveyor 65 so that if the respective meal bin is full both 67 and 65 stop. If two discharge conveyors are fitted to a mixer so that one feeds one meal bin (for ready meals) and the other the other bin (for e.g. pelleting), — no top conveyor is used and switch 45 at the end of conveyors 65 is adequate.

Figure 8:
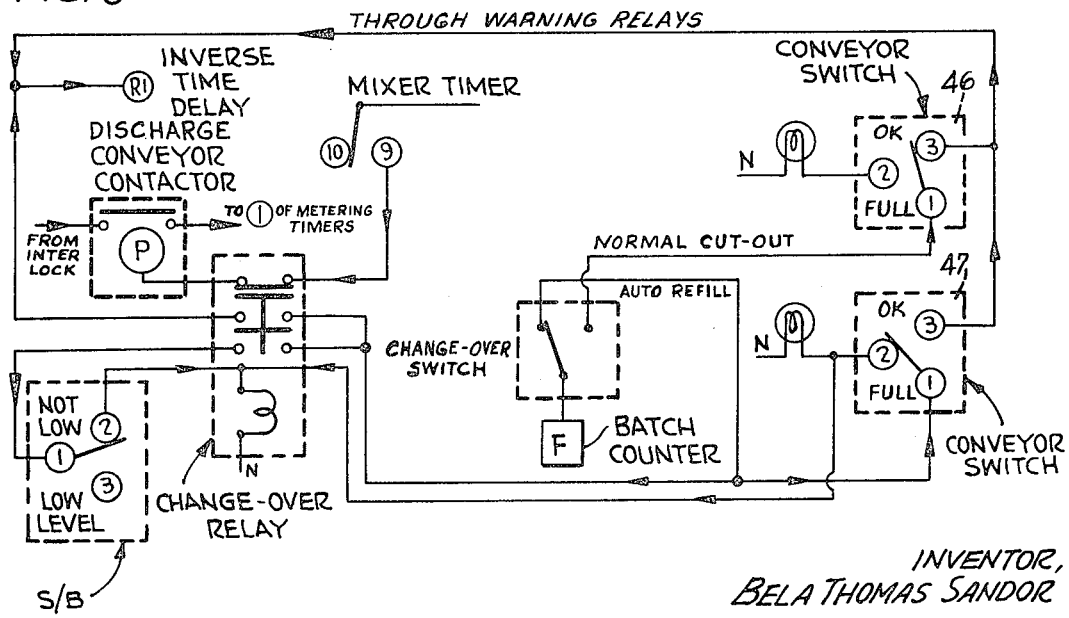
FIG. 8 is a wire diagram showing the manner of automatically filling a meal bin.

It should be noted that in the case of required automatic refilling, there must be a bottom level switch S/B (see FIG. 8) fitted to the meal bin (not shown), which requires repeated supplies, otherwise 65 or 65 and 67 (which are electrically interlocked) would "hunt" i.e. stop, start, stop — repeatedly. S/B will bring in the conveyor(s) only when the meal level therein is at low level. This means that the stoppage of 67 (and 65) is caused by the cut-out switch 46 (or 47) but 65 (and 65) will restart only when S/B shows low level. In the meantime only the mixer 60 is running as the Interlock Starter did not drop out.

The operation is as follows: when 67 is reversed to 69 (to the Pellet Meal Bin, for example), the cut-out switch 47 is brought into later use; the 'normally closed' switch of the Change-over Relay maintains the connection between 9 of the Mixer Timer and P of the Conveyor Contactor so that when the mixing time is over, the conveyors 65 and 67 start; when the said bin is full the Conveyor Switch 47 becomes 1-2, the warning light lights up and the coil of the Relay pulls disconnecting the current to P of the Conveyor Contactor so that the Conveyor stops; the 'normally open' contacts of the Relay, however, give current from F of the Batch Counter in two ways — to R1 of the Inverse Time Delay associated with the Interlock Starter, so that the latter cannot drop out in spite of the fact that it does not get current from 3 of the Conveyor Switch and to 1 of S/B which is in "Not-Low" position so that current is given by 2 also to the coil of the Relay. As a result the Relay cannot drop out when the Conveyor Switch returns to 1-3 because the bin content is lowered (the Pelleter is working).

When the meal is at low level in the bin, S/B becomes 1-3 and no current is given to the coil of the Relay, which drops out and the "third Conveyor" starts discharge again, to fill the Pellet Meal Bin. This is repeated until the Mixer Switch shows that the Mixer has become empty and a new cycle of metering and grinding can commence.

For working with 2 bins, one of which (69) requires only repeated operation, a change-over switch may be used which may also reverse the direction of 67 by simple pole change of the conveyor motor.

The functioning of the warning relays is as follows: They each have a set of change-over contacts and those controlling the flow of materials have an additional ASB (auxiliary switch to break) which prevents metering to proceed while the plant is locked out. The ASM (Auxiliary Switch To-Make) portion of all warning relays can be controlled by one PUSH BUTTON 83 which has to be pressed to release them and to turn off the lights 79 and 81 and those of all warning relays which indicated the nature and location of the particular failure. Current will nevertheless pass to the coil of a warning relay, if either the motor is overloaded (e.g., 5 to the Grinder Contactor or 9 to the Mixer Contactor) or if any Flow-Switch is in a NO-FLOW position.

The Warning Relay Switch is used to short circuit all warning relays. When placed in its NON-STOP position, the current from 3 of the Conveyor Switch passes directly to A-3 of the Inverse Time Delay so that the coil of the Interlock Starter is energized and operation can be maintained without the warning relays. This is critical pending fault repairs.

Reference is now made to FIG. 7 of the drawings for a detailed description of the metering of two different grains A and B through augers 23 and 23', respectively, to bin 33. The metering current from the Mixer Contactor seen in FIG. 6 passes to a pair of Selector Switches A and B (corresponding to grains A and B) which determine which grain is to be metered. The current also goes to P of a Time Delay and to A4 of another Inverse Time Delay. The Time Delay is in an NC or normally closed position energizing R1 of the Inverse Time Delay so that A4 is connected to A3 therein and the coil of Normally Closed Relay is energized.

The current from Selector Switch B (which is on) passes through the Normally Closed Relay to P of the Contactor B, which is pulled. Auger 23' therefore starts to meter grain B into the feed bin 33.

After a few seconds the Time Delay switches to NO (normally open) thereby energizing the coil of the Normally Open Relay which pulls and current from Selector Switch B passes through it to Timer B which is the timer of auger 23'. The role of the Inverse Time Delay is to hold a normally closed circuit during the changeover.

The current passing through 7-10 goes to 2 of Timer B, starts the clock thereof, and also passes through a normally closed set of contacts in a Warning Relay to the Flow-Switch for auger 23'. As during the NC period the grain flow has been established in auger 23', the flow-switch now holds the coil of Contactor B until the metering time elapses.

If during the NC time of the Time Delay the flow was not established, or it breaks later, the Flow-Switch is in a NO-FLOW position, energizing the coil of the Warning Delay, breaking the current to the clock of Timer B, and also the main current which leads to R1 of the Inverse Time Delay connected with the Interlock Starter in FIG. 6, so that the plant locks out; at the same time current from the Push Button 83 passes through the normally open contacts of the Warning Relay to the warning light 82 and also to the coil of the Warning Relay so that the light 82 remains on in spite of the fact that the Interlock Starter has dropped out.

The metering of concentrates or additives CA, CB commences when the Time Delay switches to NO thereby avoiding high inrush current. The operation is similar to that as described with the grain, but here the metering augers 57 and 57' and collecting conveyor 58 are used for collecting and delivering the metered concentrates CA and CB into the Mixer.

The Collecting Conveyor Contactor is pulled via the Inverse Time Delay-C which has a similar construction to the Inverse Time Delay for the grain, but is suitable for longer inverse time delays (up to 15-20 seconds). The contact 1-2 is connected because the auxiliary switches of Contactors C' and C2 are closed immediately when during the NC time of Time Delay-C the Normally Closed Relay-C gets current. As a result C of the Inverse Time Delay-C is energized. The longer inverse time delay is required because the collecting conveyor must run longer than the metering augers, to feed all their supplies into the Mixer.

After the NC time of the Time Delay-C this switches to NO and the operation is then exactly the same as with the grain, i.e., the current to the metering augers 57 and 57' is maintained until the respective times preset on the timers expire. The current flows through the timers, warning relays, flow switches to Time Relay-C, which supplies the Ps of the Contactors C, and C2 and Collecting Conveyor Contactor.

In the summary, the operation using the basic techniques and equipment as disclosed herein will be set forth in terms of the operation thereof from start to finish. Automatic metering is made possible, of all ingredients, with the use of the metering bins 21 and their associated equipment, as shown in FIG. 2. The same material will flow from the same metering bin at the same repeatable speed. The repeatability of metering is within ±1½ per cent in respect of each ingredient. A flow switch 41,41' is fitted to each metering auger 23,23' to insure that no ingredient is left out of the formula. If the respective bin becomes empty, or the metering auger becomes damaged, the plant will stop automatically, a bell will ring, and the location of the fault will be identified. Moreover, each metering bin is designed and built for complete emptying without bridging.

No bulk feed bins are required for the grain before being fed to the grinders 34. Instead, metered quantities of grain enter a small feed bin 33 so that each grinder deals with a pre-weighed mixture of grains. Specific type grinders 34 are used which discharge the meal directly into mixers 60 via ducts 37 and cyclones 38, instead of elevating it to near roof level and passing it through the usual high-horsepower fans, double cyclones and rotary valves into intermediate holding bins.

No holding bins are required between the grinders and mixers. Cost is therefore kept to a minimum, including the meal blowing, discharging and proportioning accessories. Moreover, low-horsepower vertical mixers 60 are used instead of horizontal ones. They are designed to run permanently, so that all additives from additive bulk bins 56,56', as shown in FIG. 4, are metered into the mixers as at 59 during the grinding period. The ground grain is, of course, added via duct 37 and cyclones 39 so that a supplementary mixing time of two minutes will produce a perfect mix.

The twin-mixer technique is used for plant outputs of over 7½ tons per hour. Two mixers are used in each flow line so that, while one mixer takes in the ingredients, the other mixer completes the supplementary mixing time and discharges the previous batch. The changeover is fully automatic.

The plant output with the use of such equipment is self-adjusting. If grinding is completed earlier, the changeover will occur faster without any human interference. Perfect emptying of the mixers avoids contamination. Production proceeds in quiet, self-repeating cycles, and the Time Delay switches of the automatic board insure complete emptying of all Conveyors as well. The mixers are discharged as soon as the supplementary mixing time is over. If one mixer is used, the cycle time caters for grinding, supplementary mixing, and discharge, but in the case of the twin-mixer method, the cycle time only caters for grinding as the supplementary mixing and discharge are carried out in the other mixer.

The mixed meal is discharged as at 68 and 69 for either weighing and packing, or for bulk loading or for further processing. Safety cut-out switches are fitted to wall conveyors to thereby prevent damage. Also, the automation board used for this equipment controls the complete milling and mixing process. It comprises automatic starter-contractors, "hand-off" switches, running, indicating and warning lights, self-resetting timers for metering and mixing, alarm bells, relays, time and inverse-time delay switches, etc. It receives signals from the automation switches fitted to the equipment and sends commands to all processing and conveying machinery. The automation board is supplied completely pre-wired and tested.

It will be appreciated that the invention is not limited to the specific embodiments described and although it is primarily concerned with the mixing of animal foods it may also be employed for the production of other composite mixtures in which disintegrating is followed by mixing and possibly other processing operations.

What is claimed is:

1. Disintegrating and mixing apparatus for automatically preparing successive batches of material especially animal feeding stuff, comprising:
   means for grinding a measured quantity of at least one ingredient for each batch;

a feed bin having means thereon for feeding said at least one ingredient to said grinding means, said feed bin also being provided with level responsive means for indicating whether said bin is empty or not;

at least one holding bin for the supply of pre-set quantities of said at least one ingredient;

a time controlled metering auger associated with said at least one holding bin for conveying a pre-set quantity of said at least one ingredient to said feed bin, a flow switch on said metering auger through which the pre-set quantity must pass while being fed to said feed bin, otherwise the apparatus will stop and the stoppage be indicated by a warning light;

timing means operatively associated with said flow switch for pre-setting the flow rate of said at least one ingredient from said at least one holding bin;

first conveying means for conveying said at least one ingredient directly from said at least one holding bin to said feed bin;

at least one mixer having intake means for the reception of said at least one ground ingredient and at least one other ingredients which does not require grinding, a discharge opening through which mixed material may pass, and a level responsive means to indicate whether said mixer is empty or not;

second conveying means for conveying said at least one ingredient directly from said grinding means to said at least one mixer;

a hopper;

third conveying means for transferring mixed materials between said discharge opening and said hopper, a safety switch provided for said third conveying means for stopping same when said hopper is full and for indicating the stoppage through a warning light; and an automation panel board, which may be pre-set for the required operation of the apparatus, having instruments which respond to electrical impulses transmitted thereto by said metering auger flow switch, said third conveying means safety switch, said feed bin level responsive means and said mixer level responsive means, for sending impulses to the control means provided for said instruments for fulfilling a pre-selected program, said instruments including time-delay and inverse time-delay means, timers with automatic re-setting means, batch counter, means for starting and re-starting said instruments, and means for controlling the sequence of operations by interlocking and excluding selected operations, whereby the measured quantity of said at least one ingredient is caused to be supplied to said feed bin when both said feed bin and said at least one mixer become empty while said grinder is running at working speed.

2. The apparatus according to claim 1 wherein at least one storage bin is provided for delivering therefrom a measured quantity of said at least one other ingredient which does not require grinding, said at least one storage bin having a time controlled metering auger having a flow switch associated therewith through which said at least one other ingredient must pass during delivery to said mixer intake means, otherwise the apparatus will stop and the stoppage be indicated by a warning light.

3. The apparatus according to claim 1 wherein said level responsive means on said feed bin is provided for stopping said grinding means and thereafter starting said at least one mixer when said feed bin becomes empty.

4. The apparatus according to claim 2 wherein said level responsive means on said feed bin is provided for stopping said grinding means and thereafter starting said at least one mixer when said feed bin becomes empty.

5. The apparatus according to claim 1 wherein said level responsive means on said feed bin is provided for only stopping said grinding means when said feed bin becomes empty during such time that said at least one mixer is set to run permanently.

6. The apparatus according to claim 2 wherein said level responsive means on said feed bin is provided for only stopping said grinding means when said feed bin becomes empty during such time that said at least one mixer is set to run permanently.

7. The apparatus according to claim 1 wherein two of said mixers are provided so that while one is receiving said ingredients and mixing the other is mixing and discharging by means of said third conveying means.

8. The apparatus according to claim 2 wherein two of said mixers are provided so that while one is receiving said ingredients and mixing the other is mixing and discharging by means of said third conveying means.

9. The apparatus according to claim 2 wherein a collecting conveyor is provided after said storage bin and said storage bin auger so that the metered quantity of said at least one other ingredient will pass therethrough, said collecting conveyor being run for at least the same length of time as said storage bin auger by means of said inverse time delay.

10. The apparatus according to claim 1 wherein level responsive means are provided for said hopper so that, by co-action thereof with said mixer level responsive means and said third conveying means safety switch, said third conveying means will be stopped if either said at least one mixer is empty or said hopper is full.

11. The apparatus according to claim 2 wherein level responsive means are provided for said hopper so that, by co-action thereof with said mixer level responsive means and said third conveying means safety switch, said third conveying means will be stopped if either said at least one mixer is empty or said hopper is full.

12. The apparatus according to claim 10 wherein, as a result of said co-action, said conveying means will be stopped when said hopper is full and will automatically re-start when the ingredients in said hopper level responsive means fall below a predetermined level.

* * * * *